3,278,365
INFLEXIBLE SHEET HAVING CELLULOSIC FACINGS AND AN ADHERENT OVERLAY OF A FLEXIBLE WEB EMBEDDED WITHIN A FUSED ORGANIC, THERMOPLASTIC POLYMERIC MATERIAL

Jack J. Adams, Midland, and Glen L. Gunderman, Clare, Mich., assignors to The Dow Chemical Company, Midland, Mich., a corporation of Delaware
No Drawing. Original application Apr. 1, 1958, Ser. No. 725,511, now Patent No. 3,006,799, dated Oct. 31, 1961. Divided and this application Mar. 13, 1961, Ser. No. 95,007
1 Claim. (Cl. 161—151)

This invention relates to improved articles comprising panel members and the like useful primarily for construction purposes, the articles having a decorative surface consisting of an adhering finishing overlay. More particularly, it relates to such articles where the overlay comprises an organic, thermoplastic, polymeric material.

This application is a division of U.S. Serial No. 725,511, filed April 1, 1958, and issued as U.S. Patent No. 3,006,-799.

Materials, such as plywood, composition board, including particle board and chipboard, fiberboard, gypsum board, and the like, are widely used in paneling, cabinetwork, and in similar interior utilities where a certain amount of structural strength must be combined with an attractive appearance. As commonly prepared, these materials have outer surfaces which are usually unsatisfactory from any aesthetic viewpoint to be used without modification in the above-mentioned utilities. To raise the aesthetic appeal of these materials, it has been commonplace to apply coatings of paints, varnishes, lacquers, and the like to the surface either before or after installation of the paneling or fabrication of desired structures, such as cabinets, therefrom. However, these paneling materials frequently contain gouges, chips, knotholes and similar defects which have been repaired with mastics or glued patches. Although such repairs may smooth the surface, it is frequently found that the patch has different absorbency for paints or lacquers. Thus, a primer or sealer is generally found to be necessary before application of the finish paint or lacquer.

However, even when a suitable paint or lacquer film may be applied, there are still certain disadvantages in such a surface. Chief among those disadvantages is the inherent softness of an air dried paint or lacquer coating. Interior paints ordinarily do not have outstanding mar or abrasion resistance. Neither do they have exceptional ability to withstand repetitive washings or to resist abuse. To overcome these latter shortcomings, there have been developed techniques whereby a flexible material, such as paper, textile fabric, and the like, is impregnated with a solution of a thermosettable resin; the impregnated resin set; the flexible material pressed; and the so-formed overlay laminated to the substratum with adhesives. Such multi-step processes are not conducive to low cost production. Consequently, although the overlaid product has had fairly widespread acceptance for countertops and the like, it has not found such acceptance in fields, such as paneling, where the extensive areas, as in completely panel rooms, are contemplated to be installed. The use of thermoplastic resins could advantageously overcome many of the aforementioned problems associated with paints and lacquers and yet be of relatively low cost. Up to the present time, however, there has not been a process available for applying overlays based on thermoplastics which would permit a reduction in the number of steps involved in overlaying with the thermosettable resins.

With the above problems in mind, it would be desirable to have, and it is the principal object of this invention to provide, articles having an improved decorative and protective overlay adherent to a rigid substratum.

It is a further object to provide such articles which involve the use of thermoplastic resins in the overlay.

It is a still further object to provide such articles which achieve their decorative effect through a flexible sheet embedded in an adherent, thermoplastic film.

The above and related objects are achieved by means of an article of manufacture comprising a non-metallic, non-thermoplastic substratum and an adherent overlay consisting essentially of a flexible web embodded within a fused coating of a single organic, thermoplastic, polymeric material.

The substrata contemplated as useful materials to be treated in accordance with the invention are those relatively inflexible, non-metallic, non-thermoplastic sheets having surfaces which are substantially smooth and free of gouges and other surface defects. Representing preferred substrata are those having cellulosic facings. Typical of such preferred species are plywood, composition boards, such as particle board, chipboard, and the like, and gypsum board. All of the boards of the indicated varities are characterized in being relatively inflexible in the sense that they cannot be bent about a small radius of curvature without splitting, fracturing, or being damaged in other manner. The preferred species likewise are the common materials employed in interior partitioning or paneling. Certain of them are also commonly used in cabinetwork. Other useful substrata include asbestos-cement sheets and fibrous asbestos mats, despite the fact that these latter materials are not usually employed in interior paneling applications where a decorative and protective finish is necessary or practical and may, as for example with acoustical tile, even defeat the functional utility of the material. Metallic substrata which generally present unique procedural problems (including adhesion and other difficulties peculiar to such materials) are frequently fabricated into articles that involve special coating problems. Accordingly, such metallic substrata are not to be considered within the herein claimed process.

For best results, the surface of the substratum should be relatively smooth prior to lamination of the overlay. Thus, any concavities, such as knotholes, gouges, splits, and the like, should be repaired or filled prior to lamination. In similar manner the surface should be freed of any protruding roughness in the form of grits, slivers, bumps, or other protuberance, since these will frequently be transmitted through the overlay as surface roughness. These defects may be removed by sanding, planing, or similar conventional operation. The surface should also be substantially free of grease, dirt, dust, and like materials.

The flexible, porous webs finding use in this invention may be selected from a wide variety of such materials. The webs should be unaffected in appearance by the polymeric material used and should be capable of withstanding the temperature which fusion of the polymeric material requires. Eeither woven or unwoven webs may be used. Among the woven webs may be mentioned textile fabrics, such as those made from natural fibers. Other such fabrics, such as burlap, are also operable. Although many of the synthetic, man-made fibers may be used, it should be apparent that some of those, such as the thermoplastic (i.e., cellulose acetate, etc.) rayons, are frequently incapable of withstanding the fusion temperatures of many thermoplastic, polymeric materials. However, the nylons and acrylic fibers may be used if desired. The most common of the unwoven webs is paper. Because paper is inexpensive and easily printed into decorative patterns, it represents a preferred species of flexible web. The common wallpapers are especially useful herein. Still other materials are thin veneers of various woods.

Thus, within this invention it is possible to create panels having the appearance of walnut, mahogany, birch, cherry, or other attractive wood and yet to provide a mar and abrasion resistant surface. The possibilities from a decorative point of view are innumerable. They are limited only by the imagination of the application. The flexible web controls the color and pattern of the overlay. All of the above-mentioned webs are characterized in having a flexibility which is at least as great as that of the substratum and of having a hydrophilic surface so that an aqueous medium may be coated thereon in a continuous and coherent manner.

The operable polymeric materials for use in the practice of the present invention may be selected from any organic, thermoplastic, polymeric material which has a softening point or fusion temperature which is below that at which the desired substratum and flexible web are distorted or degraded. In most instances this temperature is advantageously below about 200° C., although, when the component materials are chosen with care, higher temperatures may be employed. It is preferred that polymeric materials having fusion temperatures of below about 150° C. be employed.

Typical of the operable polymers and representing a preferred species are the copolymers of vinyl chloride and vinylidene chloride composed of a predominant amount of over 50% by weight of vinyl chloride. Such copolymers exhibit ease of handling and polishing, have good adherence to the substrata contemplated herein, have satisfactory heat and light stability, and are readily available. Other copolymers of either vinylidene chloride or vinyl chloride with another monoethylenically unsaturated comonomer, such as vinyl acetate, vinyl propionate, methyl acrylate, ethyl acrylate, 2-ethylhexyl acrylate, cyclohexyl acrylate, as well as other alkyl and cycloalkyl acrylates; methyl methacrylate and other alkyl methacrylates containing up to about 8 carbon atoms in the alkyl group; acrylic and methacrylic acid; acrylonitrile; alkyl vinyl ethers, such as ethyl vinyl ether, and substituted alkyl vinyl ethers, such as 2-chloroethyl vinyl ether; chloropropene; and 2-methyl propene. Also included are ternary and quaternary polymers based upon vinyl chloride and/or vinylidene chloride.

Still further examples of useful polymeric materials are the polymers and copolymers of the alkyl and cycloalkyl acrylates and the alkyl and cycloakyl methacrylates. These include the copolymers and interpolymers of such acrylic esters with one another or with one or more different monoethylenically unsaturated compounds, such as those listed above. Other examples include the polymers and copolymers of monoalkenyl aromatic monomers containing from 8 to about 12 carbon atoms, such as styrene, para-methyl styrene, meta-ethyl styrene, ortho-para-dimethyl styrene, para-chlorostyrene, isopropyl styrene, ortho-methyl-paraisopropyl styrene, and ortho-para-dichlorostyrene, and also those materials resulting from the copolymerization of styrene with α-methyl styrene or with one or more of the above-named monoalkenyl aromatic monomers. Also contemplated are the thermoplastic copolymerizates of styrene or of the other monoalkenyl monomers with other monoethylenically unsaturated monomers including acrylonitrile, alkyl and cycloalkyl acrylates, and the others listed supra.

Among still other useful polymeric materials may be mentioned the copolymers of conjugated diolefins, such as butadiene, with monoethylenically unsaturated monomers, such as acrylonitrile, styrene, or the others previously mentioned.

The above-mentioned species are intended to only illustrate the operable thermoplastic materials suitable for use in the practice of the invention. Many other combinations will be readily apparent to the skilled worker. All of the above-indicated materials are capable of easy operability within the herein claimed process. Other materials, exemplified by the polyamides, polytetrafluoroethylene, and polychlorotrifluoroethylene, are operable only with extreme difficulty, due to the problems of obtaining such materials in the form of a latex, and particularly due to their extremely high fusion temperatures which, in some instances, may be above the practical operational capacity for existing equipment and above the temperatures which may be tolerated by the flexible web and substratum.

Latexes of many of the above-described polymeric materials are available commercially. Any that are not may be readily and conveniently prepared in accordance with well-known emulsion polymerization techniques and principles. In a typical preparation, the monomeric materials are dispersed into an aqueous phase containing a small amount of a water-soluble, free-radical polymerization catalyst, such as potassium persulfate, hydrogen peroxide, or the like, and a small concentration of an emulsifier for the particular monomeric materials being polymerized. Those emulsifiers will be known or judicious selection of them can be easily made after simple preliminary experiment. The aqueous dispersion of monomers is caused to polymerize under thermal and catalytic inducement until substantially all of the monomers have been converted to polymer. The latex is then filtered to remove any pre-coagulum and post-stabilized, if necessary or desired, by the incorporation therein of small amounts of additional wetting agents. Such latexes may be prepared in either batchwise operations or in a continuous manner. As is known, improved compositional homogeneity usually results when the monomers are added continuously or intermittently to the polymerizing system according to a pre-arranged schedule based on their relative reactivity.

Although successful operability of the process by which the articles are made is independent of the polymer solids content, it has been found to be advantageous to employ latexes having from about 10 to about 50% by weight of polymer solids. It is preferred to use those containing from about 25 to about 50% by weight of polymer solids. When the latex contains appreciably less than 10% solids, the deposit of polymer on the flexible web from a single pass or cycle is frequently found to be inadequate for achieving the desired coating thickness. The consequence is that the web must usually be exposed repetitively to the latex to achieve adequate polymer deposit thereon. Latexes having appreciably more than about 50% by weight of solids are difficult to prepare. In addition, they are extremely sensitive to mechanical shear and, upon prolonged storage, may tend to coagulate prematurely.

Additives are commonly incorporated into polymer formulations for specific functions. Typical of these additives are latex thickeners and stabilizers, and light and heat stabilizers for the polymer. Pigments and dyes may be added, if desired, as may fillers, such as diatomaceous silica or calcium carbonate. Other useful fillers will be known to the skilled worker. It has been found that the particle size of any filler should be no greater than about that of the coating thickness. It is preferred that the particle size should be of from about 10 microns to about 100 microns. The use of such fillers usually results in a coating surface of reduced gloss when compared to that resulting from an unfilled composition. In addition, some polymers require plasticizers for best fusion characteristics. Any of the above additives may be used provided that they are uniformly distributed throughout the latex.

The manipulative steps of the process by which the articles are made consist basically and generally of (1) depositing the polymeric solids of an aqueous latex on the flexible, porous web; (2) dewatering of the so-treated web; and (3) laminating of the treated web to the substratum. The deposition of the latex solids upon the web may be achieved by applying the latex to the web by any of several known means which may be desired, such as immersion, spraying, doctoring, rolling, brushing, or similar technique. It has been found, however, that with most of the webs (such as paper and fabrics) the web is so open as to permit complete diffusion and penetration therethrough. When such completely impregnated webs are laminated, the resulting laminate may have areas of translucent spots which detract from the overall appearance. When the dried web which has been impregnated in the indicated manner, is laminated to the substratum, the result is an article with a surface having the desired functional utility but which sometimes may have areas of translucence, transparency, or opaqueness. This yields a surface of reduced aesthetic appeal. It is preferred, therefore, to deposit the latex solids substantially on the surface of the web with only enough penetration of the web to achieve adequate adherence of the latex solids to prevent their easy removal through normal handling and storage operations. This state is readily achieved by first wetting the web with a solution of a coagulant for the latex to be used. The solvent employed in the coagulant solution should be a non-solvent for both the web and the polymer to be applied and should be at least miscible with water. The use of water-immiscible solvents causes inefficient coagulation and results in a discontinuous, spotty deposit on the web when the latex is subsequently applied to the web. Water meets almost all requirements for such a solvent. Thus, aqueous solutions of coagulant are preferred. Coagulants for polymer latexes are well known and include polyvalent metalic salts, such as magnesium chloride, calcium chloride, and aluminum sulfate, as well as other electrolytes; certain organic solvents, such as ketones, and other coagulants. The concentration of the solution will depend upon the amount required in the web, which in turn will depend to great extent on the particular polymer employed. Usually, aqueous solutions of electrolyte coagulants should contain from about 0.5 to about 20% by weight of coagulant and when the webs are saturated with such solutions the subsequent coagulation is efficiently accomplished. The coagulant concentration determines the amount of coagulant deposited on the web which in turn is influential in determining the coating weight applied to the web. This effect is exemplified in the following results. When a piece of wallpaper was dipped into a latex bath and dried, the coating weight of polymer was found to be 3.64 grams per square foot. When first dipped into a 0.5% aqueous solution of calcium chloride and then into the latex and dried, the coating weight was 2.76 grams per square foot. With a 5% calcium chloride solution, the coating weight was 9.02 grams per square foot.

The saturation of the web with coagulant solution is most conveniently carried out by immersion of the web in a bath of the solution. If more rapid and uniform wetting is desired, a small amount of surface-active agent may be dissolved in the coagulant solution. Other means of saturating the web will be apparent. Following saturation, the web is allowed to drain dry of excess solution. The presence of puddles or other excesses of coagulant solution or the non-uniform wetting of the web will result in ineffective, erratic coagulations which are difficult to reproduce and which lead to articles of less than optimum appearance.

While still wet with coagulant solution, the web may be contacted with a uniform amount of latex solids. This is readily achieved by dipping the wetted web into the latex, followed by draining off of the excess or of removal of excess latex by known doctoring means. The desired result is a smooth uniform usually opaque deposit of the wet coagulum of the latex. However, the use of the wet saturated web repetitively causes ultimate contamination of the latex bath. Accordingly, it is preferred to dry the coagulant saturated web prior to the treatment with latex.

It has been found that to achieve continuous adhesion and fusion, the dried polymer should be present on the flexible web in an amount by weight of from about 2 to about 20 grams per square foot, preferably from about 6 to about 10 grams per square foot. The required minimum coating weight will be dependent upon the specific gravity of the polymer used. Thus, with certain very light or very heavy polymers it may be possible to use less or more, respectively, of the polymer. The amount of polymer will also depend upon the coating thickness desired. With most flexible web materials it will be found desirable to have a finished overlay of from about 0.002 to about 0.010 inch in thickness. When the thickness is appreciably less, there frequently will be found to be insufficient polymer for both good bonding and a smooth surface. A thickness of significantly more than 0.010 inch prolongs the fusion steps. The actual amount of polymer to be deposited, therefore, may be varied within relatively wide limits. An investigator will be able to determine the desired weight by simple preliminary runs.

Following deposition, the treated web is dewatered and dried. The dewatering and drying is hastened by exposure to elevated temperatures of up to about 200° C., and preferably of from about 90 to 100° C., at atmospheric or sub-atmospheric pressures. The temperature should usually be kept below the softening temperature of the polymer or below the temperature of incipient fusion. However, where the treated web is to be shipped, stored, or handled considerably prior to lamination, it may be desirable to partially sinter the polymer to improve adherence to the web. The coating should not be completely fused, however, since no beneficial result is achieved by fusing the web prior to lamination, and the web resulting from such fusion may be tacky or have a tendency to block and consequently be difficult to store in stacks, on cores, or in other conventional manner. Temperatures of from 50 to about 100° C. will usually be found to provide optimum drying conditions with most polymers, although higher or lower temperatures may be employed when desired. Even room temperature air drying may be used. Such drying procedure, however, requires undesirably prolonged times. The dried, treated web may be stored for prolonged periods or may be used immediately in the subsequent laminating steps.

Lamination is achieved by bringing the dried, treated web into compressive pressure relationship with the desired substratum at an elevated temperature at which fusion of the polymer deposit is achieved. The required pressure may be imparted to the article with a reciprocating, hydraulic press having heated platens or with a calender stack having heated rolls. It is only necessary that sufficient pressure be applied to cause continuous adherence of the fused polymer at the temperature employed. When hydraulic presses are used, it has been found that application of pressures of from about 100 to about 800 pounds per square inch will suffice. The actual pressure required for optimum results will vary depending upon the polymer used, the thickness of the deposit, and the temperature employed. Within the above stated pressure range, the temperature may be selected within the range of from about 80° C. to the softening point of the polymer. As previously indicated, the applied pressure and the temperature are co-dependent. Selection of the optimum conditions may thus be easily made following simple preliminary experiments. When using these hydraulic presses, it is usually necessary to subject the article to the pressure and temperature conditions for at least 30 seconds to achieve complete fusion. If longer than about 2 to 3 minutes is required, the production cycle is so long as to be less attractive commercially. In such cases, higher pressures and/or temperatures should be considered.

An alternative means for causing lamination is passage of the web and substratum in contiguous relationship through the nip of a pair of heated calender rolls. Because the article is subjected to the conditions for a considerably shorter time, the temperatures and pressures required for lamination will almost always be appreciably higher than the corresponding conditions for a reciprocating press. Thus, temperatures of from about 90° C. to the softening point of the polymer may be used with the gap widths of the nip adjusted to secure complete fusion and adhesion upon passage of the elements therethrough. The products resulting from the calendering have been found to have significantly better mar resistance than do their press-polished counterparts.

As is known in the high polymer art, some polymeric materials will release hot whereas others tend to release cold from a platen, mold, or other surface. The release of any polymer is improved immeasurably by dusting or coating the surface of the platen with a lubricant, such as the alkali metal stearates, or a mold release agent, such as certain silicone resins.

The process is adaptable to almost any shape or form to which the overlay itself may be shaped. Paneling materials are most commonly sold as flat planks or sheets. However, it is frequently desirable to have inside and outside corner members, as well as gently curved section. The problem in adapting the herein claimed process to the latter members is one of mechanical design of the pressure applying apparatus. Equipment for pressing such sections are well known and within the skill of the mechanical artisan.

The resulting of the process is a substratum having a hard, mar and abrasion resistant overlay of attractive appearance. The so-formed articles are provided with inexpensive materials which are formed by a simple process. This, of course, permits the articles to be more economically obtained and, as a consequence, more merchandisable than the prior overlaid articles for use in the paneling and allied fields. Because one polymeric material is employed as both adhesive and surface coat, there are additional economies evident in purchasing, storage, and equipment. Also, since only one polymeric material is used, the process is readily adaptable to continuous operation.

The operation of the process and advantages of the article will be more apparent from the following illustrative examples wherein all parts and percentages are by weight.

EXAMPLE 1

An aqueous latex was prepared by the emulsion polymerization of 75% vinyl chloride and 25% vinylidene chloride. The latex contained about 50% polymeric solids and had a viscosity of about 20 centipoises. The copolymer had a melting point of about 164° C. A piece of printed very thin wallpaper was saturated with a 20% aqueous solution of calcium chloride and allowed to drain. While still wet with the calcium chloride solution, the wallpaper was next dipped into the latex and allowed to drain. The wallpaper was allowed to air dry at room temperature for 24 hours. The paper was covered with a white deposit of discrete particles of the copolymer. The wallpaper was then pressed on a piece of gypsum board using a polished molding plate and a reciprocating platen press. The conditions employed were 400 pounds per square inch at 120° C. for 30 seconds. The press platens were cooled and the laminate removed. The result was a clear, hard, smooth overlay which highlighted the colors of the wallpaper. The overlay was securely bonded to the gypsum board.

In similar manner unbleached cotton sheeting, 5 ounce duck, muslin, fiber glass fabric, burlap, birch veneer, mahogany veneer and black walnut veneer were employed in place of the wallpaper. The result in each case was an overlaid article with excellent properties as described above.

Similar results were obtained when the latex-treated wallpaper was dried in an oven at about 70° C.

EXAMPLE 2

A piece of the wallpaper used in the prior example was dipped into the latex described therein and allowed to air dry for 24 hours. The dried wallpaper was then pressed onto gypsum board under the conditions of Example 1. After cooling and removal of the laminate, the result was a securely bonded, hard, smooth overlay generally similar to that of the previous example. The article was found to have several translucent spots. When this process was repeated using a heavy grade of wallpaper, there were no translucent spots.

EXAMPLE 3

The process of Example 1 was repeated using Douglas fir plywood, birch plywood, red oak plywood, chipboard, and particle board as the substratum in place of the gypsum board. The result in each instance following lamination was the same adherent, clear, hard, smooth overlay bonded to the substratum.

EXAMPLE 4

The process of Example 1 was again repeated except that a pair of 8-inch calender rolls was used as pressure means in place of the platen press. Lamination was achieved by a single pass at one revolution per minute at 150 pounds per square inch pressure with the roll pressing against the wallpaper, heated to 140° C. The result was the same as that observed in Example 1.

EXAMPLE 5

Several latexs having the following compositons were prepared: (A) 60% styrene–40% butadiene; (B) 80% styrene–20% butadiene; (C) a blend of polystyrene with from 30 to 35% of a rubber prepared from about 25% butadiene and 75% styrene; (D) 90% vinylidene chloride–10% ethyl acrylate; (E) 30% vinylidene chloride–70% ethyl acrylate; (F) 50% vinylidene chloride–40% vinyl chloride–10% ethyl acrylate; (G) 60% vinyl chloride–40% ethyl acrylate; (H) 85% vinyl chloride–15% ethyl acrylate; (I) 80% methyl methacrylate–20% 2-ethylhexyl acrylate; (J) 33% methyl methacrylate–67% ethyl acrylate; (K) 90% vinylidene chloride–3% acrylonitrile–7% ethyl acrylate; (L) 75% vinylidene chloride–20% vinyl chloride–5% ethyl acrylate; (M) 75% vinylidene chloride–25% acrylonitrile; (N) 50% vinyl toluene–50% butadiene; (O) a butadiene-high acrylonitrile latex sold commercially as "Hycar 1551" by B. F. Goodrich Company; (P) a polyvinyl acetate sold commercially as "Resyn 12K51" by the National Starch Company.

Pieces of wallpaper were immersed in 3% aqueous calcium chloride solutions, drained, and reimmersed in a bath of each of the above latexes. The papers were air dried for 24 hours and laminated to gypsum board under the conditions listed in the following table. The appearance of the overlay was checked visually. When the overlay was clear, hard, and polished with good highlighting of the wallpaper colors, the rating was good. A slight reduction in any of these characteristics was rated fair, and a serious defect in any one or more of the characteristics caused a poor rating. Bonding to the substratum was determined by attempting to separate overlay from substratum. When the overlay was removed with adhering amounts of substratum, the rating was good. When the overlay could be chipped or peeled from the substratum, the rating was poor. The results are listed in the table.

Table

| Latex | Laminating Technique | Release | Time (secs.) | Temp. °C. | Pressure p.s.i. | Roll Spread (r.p.m.) | Appearance | Bonding |
|---|---|---|---|---|---|---|---|---|
| A | Calendered | | | 140 | 150 | 1 | Good | Fair. |
| B | Press | Cold | 15 | 150 | 500 | | do | Good. |
| C | do | do | 30 | 150 | 500 | | do | Do. |
| D | do | do | 15 | 150 | 500 | | do | Do. |
| D | do | Hot | 15 | 120 | 500 | | do | Do. |
| E | Calendered | | | 90 | 150 | 1 | do | Do. |
| F | Press | Cold | 15 | 150 | 500 | | do | Do. |
| F | do | Hot | 15 | 120 | 500 | | do | Do. |
| G | Calendered | | | 90 | 150 | 1 | do | Do. |
| G | Press | Cold | 15 | 150 | 500 | | do | Do. |
| G | do | Hot | 15 | 120 | 500 | | do | Do. |
| H | Calendered | | | 90 | 150 | 1 | do | Do. |
| I | Press | Hot | 15 | 120 | 500 | | Poor | Do. |
| J | Calendered | | | 90 | 150 | 1 | Good | Poor. |
| K | do | | | 118 | 150 | 1 | do | Good. |
| K | Press | Hot | 15 | 120 | 500 | | do | Do. |
| L | do | Cold | 15 | 150 | 500 | | Fair | Do. |
| L | do | Hot | 15 | 120 | 500 | | Good | Do. |
| M | do | Cold | 15 | 150 | 500 | | do | Do. |
| N | Calendered | | | 90 | 150 | 1 | Fair | Do. |
| O | Press | Hot | 15 | 120 | 500 | | Good | Do. |
| P | do | Cold | 15 | 150 | 500 | | do | Do. |

Although, as expected, there was some difference in hardness and other properties, all of the overlaid panels were considered to be acceptable for commercial utilization.

EXAMPLE 6

The process of Example 1 was repeated except that a vapor-blasted molding plate was employed in place of the polished molding plate. The result was a matte finish on the overlay.

EXAMPLE 7

The process of Example 1 was repeated except that the composition contained about 37% based on the latex solids, of a diatomaceous silica of a particle size such that 97% passed through a 325 mesh sieve of the U.S. Standard Series. After pressing, the overlay was found to have a matte finish which was similar to that obtained in Example 6.

The same result was obtained when the silica was replaced by a finely ground calcium carbonate having an average particle size of 14 microns and a maximum particle size of 25 microns.

What is claimed is:

An article of manufacture comprising a substratum of a relatively inflexible sheet having cellulosic facings, said sheet being selected from the group consisting of plywood, composition board and gypsum board and an adherent overlay consisting essentially of a flexible web embedded within a fused coating of a single organic, thermoplastic, polymeric material.

References Cited by the Examiner

UNITED STATES PATENTS 2,414,125  1/1947  Rheinfrank.
2,454,209  11/1948  Rogers et al.
2,530,441  11/1950  Reinhardt et al.
2,868,684  1/1959  Labino.
2,949,394  8/1960  Rodman.

EARL M. BERGERT, *Primary Examiner.*

C. T. KRAFFT, *Examiner.*

M. SUSSMAN, *Assistant Examiner.*